US012633449B2

(12) United States Patent
Kawaguchi et al.

(10) Patent No.: US 12,633,449 B2
(45) Date of Patent: May 19, 2026

(54) CHIP-TYPE COIL COMPONENT

(71) Applicant: TDK Corporation, Tokyo (JP)

(72) Inventors: Yuuichi Kawaguchi, Tokyo (JP); Masanori Suzuki, Tokyo (JP); Tomonaga Nishikawa, Tokyo (JP); Mitsuo Natori, Tokyo (JP); Osamu Nakada, Tokyo (JP)

(73) Assignee: TDK Corporation, Tokyo (JP)

( * ) Notice: Subject to any disclaimer, the term of this patent is extended or adjusted under 35 U.S.C. 154(b) by 800 days.

(21) Appl. No.: 17/988,338

(22) Filed: Nov. 16, 2022

(65) Prior Publication Data

US 2023/0170135 A1 Jun. 1, 2023

(30) Foreign Application Priority Data

Dec. 1, 2021 (JP) ................................ 2021-195563

(51) Int. Cl.
*H01F 27/29* (2006.01)
*H01F 17/04* (2006.01)

(52) U.S. Cl.
CPC ........... *H01F 27/292* (2013.01); *H01F 17/04* (2013.01)

(58) Field of Classification Search
CPC ............................... H01F 27/292; H01F 17/04
See application file for complete search history.

(56) References Cited

U.S. PATENT DOCUMENTS

| | | | |
|---|---|---|---|
| 2016/0020012 A1 | 1/2016 | Takagi et al. | |
| 2017/0288004 A1 | 10/2017 | Kim et al. | |
| 2018/0061551 A1* | 3/2018 | Kondou | H01F 27/323 |
| 2019/0115127 A1* | 4/2019 | Iso | H01F 27/2852 |
| 2020/0082990 A1* | 3/2020 | Yamamoto | H01F 27/363 |
| 2020/0104549 A1 | 4/2020 | Russell-Clarke et al. | |
| 2020/0286674 A1* | 9/2020 | Han | H01F 27/2804 |
| 2020/0308429 A1 | 10/2020 | Fukui et al. | |
| 2021/0057146 A1* | 2/2021 | Yang | H01F 27/292 |
| 2021/0098177 A1* | 4/2021 | Gibu | H01F 27/29 |
| 2021/0257149 A1 | 8/2021 | Okumura et al. | |
| 2021/0350980 A1* | 11/2021 | Park | H01F 17/0006 |
| 2022/0102051 A1* | 3/2022 | Yoshizawa | H01F 27/255 |
| 2022/0148794 A1* | 5/2022 | Park | H01F 27/324 |

FOREIGN PATENT DOCUMENTS

| | | |
|---|---|---|
| CN | 1238537 A | 12/1999 |
| JP | 2020-164380 A | 10/2020 |

* cited by examiner

*Primary Examiner* — Malcolm Barnes
(74) *Attorney, Agent, or Firm* — Rimon P.C.

(57) ABSTRACT

Disclosed herein is a chip-type coil component that includes a magnetic element body, a coil pattern embedded in the magnetic element body, and a terminal electrode connected to the coil pattern and exposed to a mounting surface of the magnetic element body. A recessed part obtained by removing a part of the magnetic element body is formed in an upper surface of the magnetic element body positioned on a side opposite the mounting surface to function as a directional mark.

4 Claims, 9 Drawing Sheets

CHIP-TYPE COIL COMPONENT

CROSS-REFERENCE TO RELATED APPLICATION

This application claims the benefit of Japanese Patent Application No. 2021-195563, filed on Dec. 1, 2021, the entire disclosure of which is incorporated by reference herein.

BACKGROUND OF THE ART

Field of the Art

The present disclosure relates to a chip-type coil component and, more particularly, to a chip-type component having a structure in which a coil pattern is embedded in a magnetic element body.

Description of Related Art

JP 2020-164380A discloses a chip-type coil component in which a directional mark is printed on the upper surface of an element body. This allows the direction of the chip-type coil component to be correctly recognized upon mounting.

However, the presence of the directional mark disadvantageously increases the height of the chip-type coil component by the thickness of the mark. To prevent this, the height dimension of the element body of the chip-type component may be reduced by the thickness of the mark; however, when a magnetic material is used for the element body, its magnetic characteristics may deteriorate due to a reduction in the volume of the magnetic element body.

SUMMARY

It is therefore an object of the present disclosure to suppress a reduction in the volume of the magnetic element body in a chip-type coil component having a directional mark.

A chip-type coil component according to the present disclosure includes: a magnetic element body; a coil pattern embedded in the magnetic element body; and a terminal electrode connected to the coil pattern and exposed to the mounting surface of the magnetic element body, wherein a recessed part obtained by removing a part of the magnetic element body is formed in the upper surface of the magnetic element body positioned on the side opposite the mounting surface to function as a directional mark.

BRIEF DESCRIPTION OF THE DRAWINGS

The above features and advantages of the present disclosure will be more apparent from the following description of certain preferred embodiments taken in conjunction with the accompanying drawings, in which.

DETAILED DESCRIPTION OF THE EMBODIMENTS

Preferred embodiments of the present disclosure will be explained below in detail with reference to the accompanying drawings.

First Embodiment

Figure 1A:
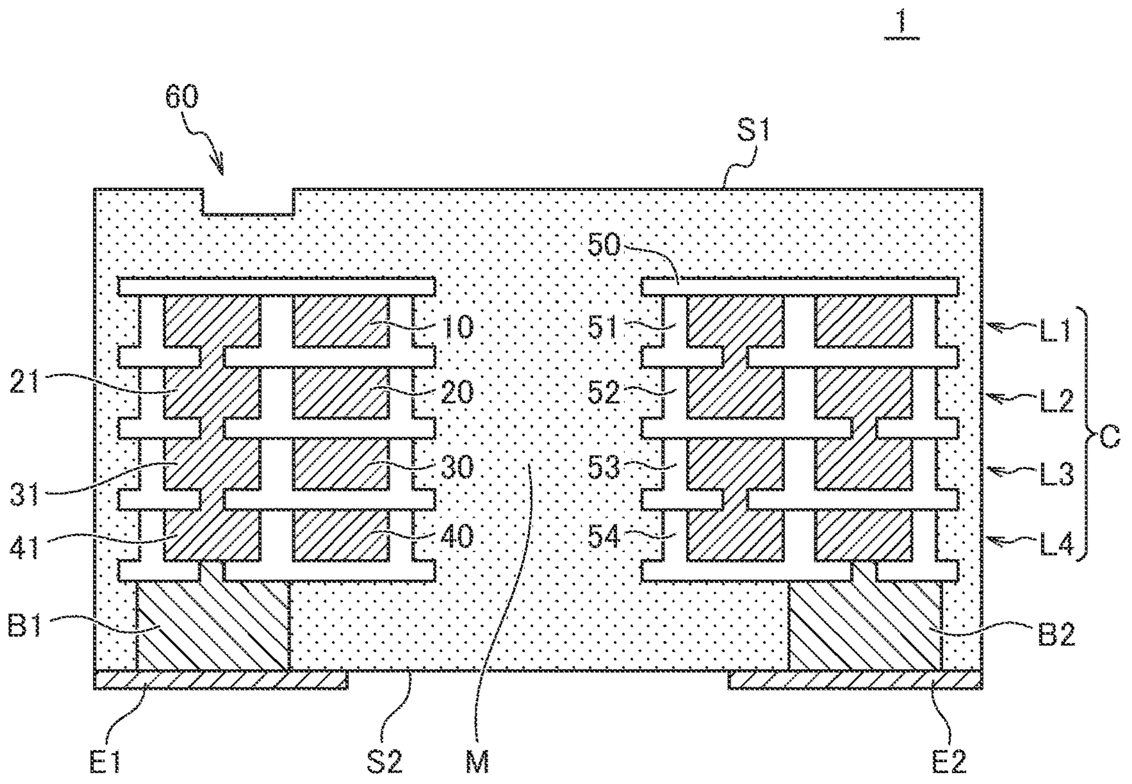
FIG. 1A is a schematic cross-sectional view of a chip-type coil component 1 according to a first embodiment of the present disclosure.
Figure 1B:
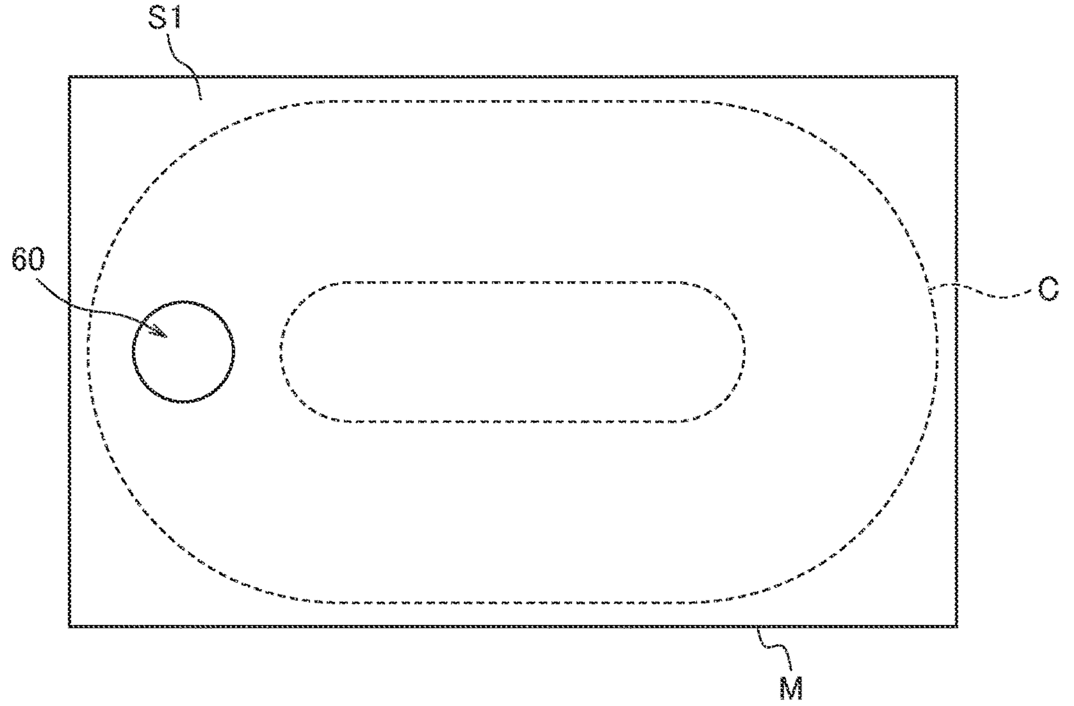
FIG. 1B is a top view of a chip-type coil component 1.

FIGS. 1A and 1B are, respectively, schematic cross-sectional and top views of a chip-type coil component 1 according to a first embodiment of the present disclosure.

As illustrated in FIGS. 1A and 1B, the chip-type coil component 1 according to the first embodiment has a structure in which a coil pattern C is embedded in a magnetic element body M. The magnetic element body M has an upper surface 51 and a mounting surface S2 which are perpendicular to a coil axis and positioned on mutually opposite sides. Terminal electrodes E1 and E2 are exposed to the mounting surface S2. Upon mounting on a circuit board, the terminal electrodes E1 and E2 are soldered onto the circuit board such that the mounting surface S2 faces the circuit board.

The coil pattern C includes interlayer insulating films 50 to 54 and conductor layers L1 to L4 which are alternately stacked in a coil axis direction. The coil pattern C is embedded in the magnetic element body M. The magnetic element body M has a part that covers the coil pattern C from both sides in the coil axis direction, a part existing in the inner diameter area of the coil pattern C, and a part existing in the outside area of the coil pattern C. The magnetic element body M also embeds therein bump electrodes B1 and B2. The bump electrodes B1 and B2 connect one end and the other end of the coil pattern C to the terminal electrodes E1 and E2, respectively.

The conductor layers L1 to L4 have spiral patterns 10, 20, 30, and 40, respectively. The spiral patterns 10, 20, 30, and 40 are connected in series, whereby one coil pattern C is formed. The conductor layers L2 to L4 further have connection patterns 21, 31, and 41, respectively, and the bump electrode B1 is connected to the outer peripheral end of the spiral pattern 10 through the connection patterns 21, 31, and 41. The inner peripheral end of the spiral pattern 10 is connected to the inner peripheral end of the spiral pattern 20, the outer peripheral end of the spiral pattern 20 is connected to the outer peripheral end of the spiral pattern 30, the inner peripheral end of the spiral pattern 30 is connected to the inner peripheral end of the spiral pattern 40, and the outer peripheral end of the spiral pattern 40 is connected to the bump electrode B2. As a result, the spiral patterns 10, 20, 30, and 40 are connected in series between the terminal electrodes E1 and E2.

The magnetic element body M is a composite magnetic member containing magnetic metal fillers made of iron (Fe) or a permalloy-based material and a resin binder and forms a magnetic path for magnetic flux generated by a current flowing in the coil pattern C. The resin binder is preferably epoxy resin of liquid or powder.

In the chip-type coil component 1 according to the present embodiment, there is formed, on the upper surface S1 of the magnetic element body M, a recessed part 60 obtained by removing a part of the magnetic element body M. The recessed part 60 is formed at a position overlapping the coil pattern C as viewed in the stacking direction. The recessed part 60 functions as a directional mark, that is, plays a role as a mark allowing recognition of the direction of the chip-type coil component 1 upon mounting. As described above, in the present embodiment, the recessed part 60 functions as a directional mark, so that, unlike conventional chip-type coil components where the directional mark is formed by printing, there does not occur a situation where the height of the chip-type coil component 1 is increased by the thickness of the directional mark. This eliminates the need of reducing the height of the magnetic element body M by the thickness of the directional mark, allowing the volume of the magnetic element body M to be sufficiently ensured. Further, the flatness of the upper surface S1 can be kept, so that the posture of the chip-type coil component 1 can be made stable during a time when the chip-type coil component 1 is conveyed with the upper surface S1 facing downward.

There is no particular restriction on a formation method for the recessed part 60, and the recessed part 60 may be formed by laser machining or drilling, or by forming a projecting part in a metal mold used for forming the magnetic element body M. When the recessed part 60 is to be formed by laser machining or drilling, etching may be applied after formation of the recessed part 60 to remove magnetic metal fillers exposed to the surface of the magnetic element body M, followed by formation of the terminal electrodes E1 and E2.

Figure 2:
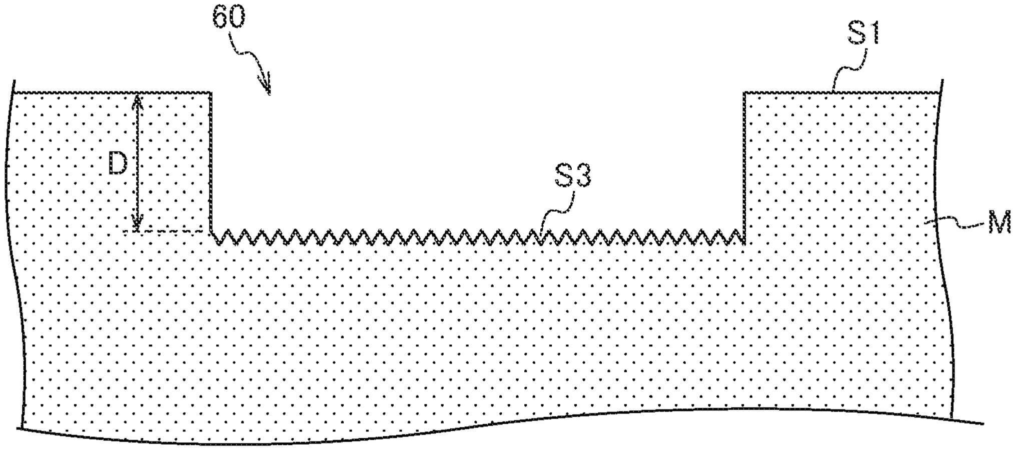
FIG. 2 is a schematic enlarged view of the recessed part 60.

Further, when the recessed part 60 is to be formed by laser machining, laser machining conditions may be set such that the surface roughness of a bottom surface S3 of the recessed part 60 becomes larger than the surface roughness of the upper surface S1, as illustrated in FIG. 2. This increases contrast between the upper surface S1 and the bottom surface S3, thereby improving visibility. On the contrary, the surface roughness of the bottom surface S3 of the recessed part 60 may be smaller than the surface roughness of the upper surface S1. Even in this case, high contract can be obtained. A depth D of the recessed part 60, i.e., the difference in height between the upper surface S1 and the bottom surface S3 is preferably as small as possible within a range in which sufficient visibility can be obtained so as to sufficiently ensure the volume of the magnetic element body M. Further, the bottom surface S3 of the recessed part 60 may not necessarily be flat and may have, for example, a curved shape in which the depth D becomes larger toward the center thereof.

Second Embodiment

Figure 3:
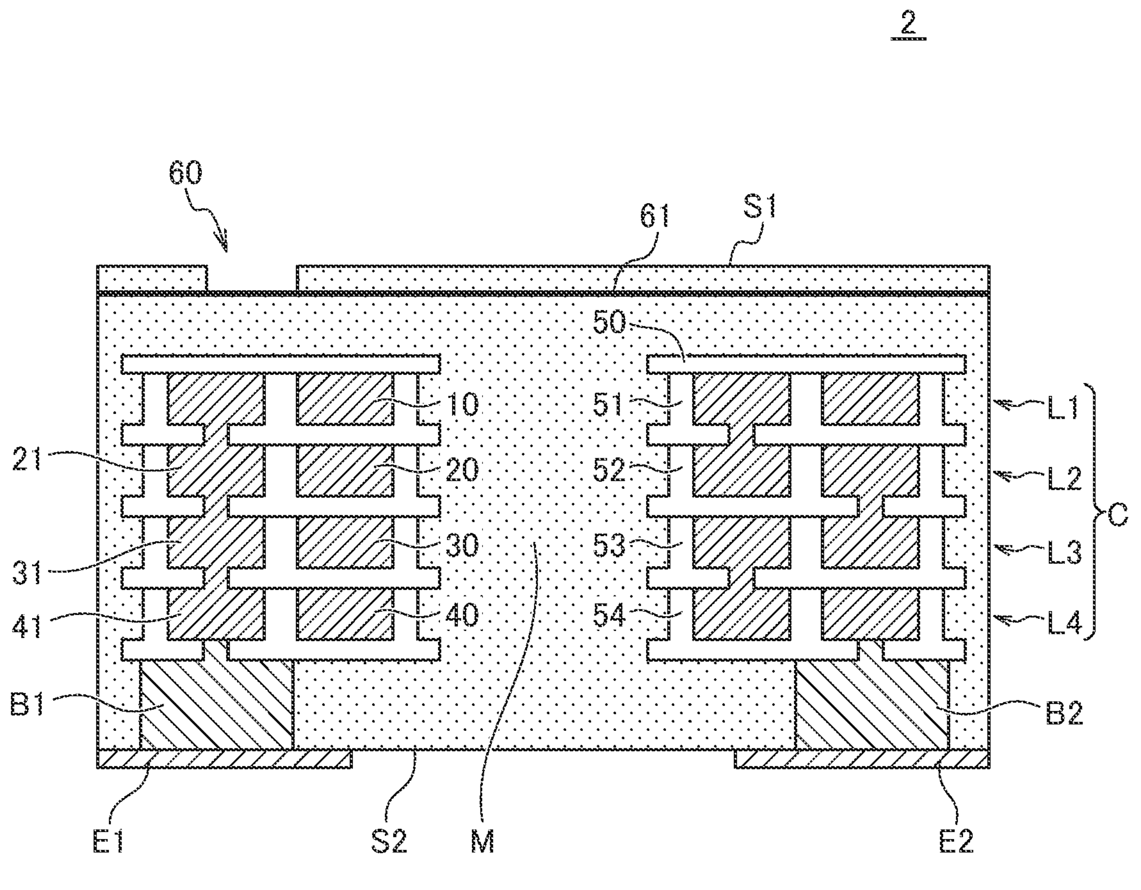
FIG. 3 is a schematic cross-sectional view illustrating a chip-type coil component 2 according to a second embodiment of the present disclosure.

FIG. 3 is a schematic cross-sectional view illustrating a chip-type coil component 2 according to a second embodiment of the present disclosure.

As illustrated in FIG. 3, the chip-type coil component 2 according to the second embodiment differs from the chip-type coil component 1 according to the first embodiment in that a metal film 61 is embedded in the magnetic element body M. Other basic configurations are the same as those of the chip-type coil component 1 according to the first embodiment, so the same reference numerals are given to the same elements, and overlapping description will be omitted.

The metal film 61 is embedded in the surface layer part of the magnetic element body M in the vicinity of the upper surface S1 and functions as a stopper upon formation of the recessed part 60 by laser machining. Thus, the depth D of the recessed part 60 is determined by the depth position of the metal film 61, thereby facilitating adjustment of the depth of the recessed part 60. Further, in the present embodiment, the metal film 61 may be exposed to the bottom surface of the recessed part 60. In this case, contrast between the recessed part 60 and the upper surface S1 increases to improve visibility.

Third Embodiment

Figure 4:
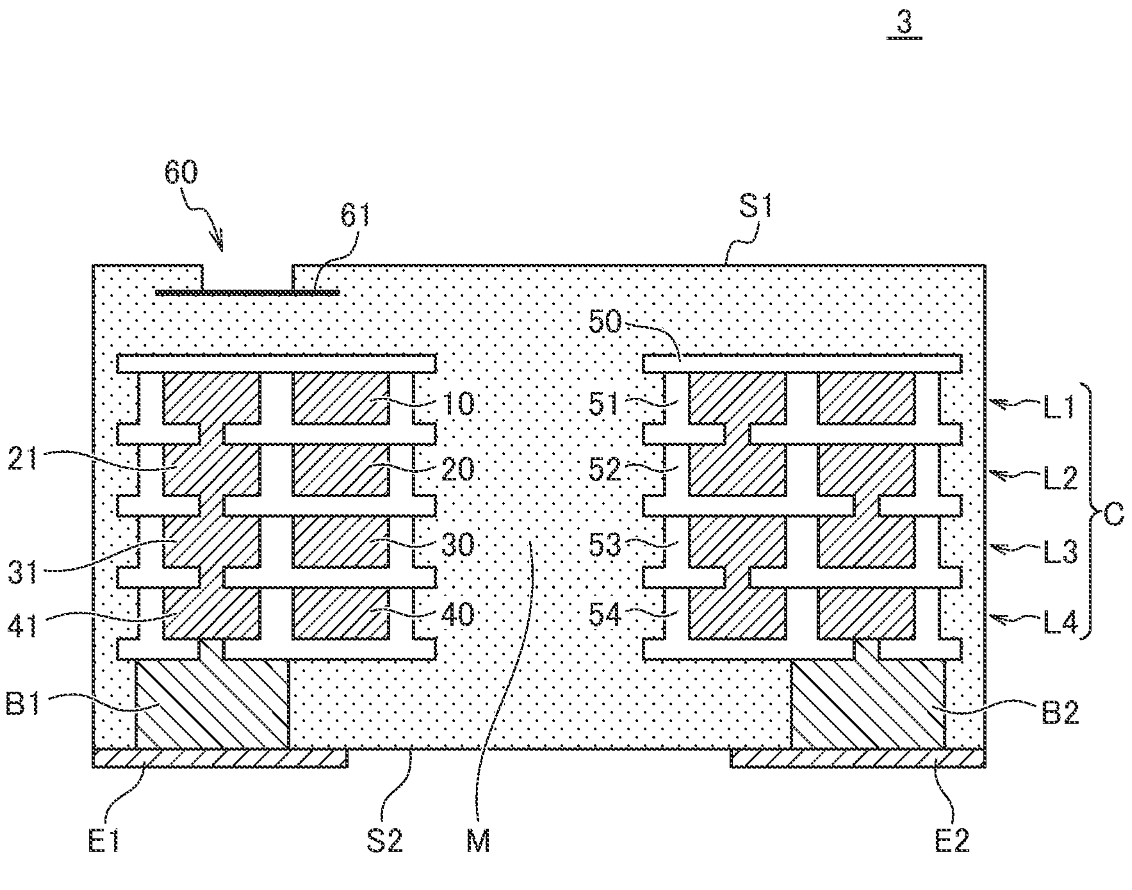
FIG. 4 is a schematic cross-sectional view illustrating a chip-type coil component 3 according to a third embodiment of the present disclosure.

FIG. 4 is a schematic cross-sectional view illustrating a chip-type coil component 3 according to a third embodiment of the present disclosure.

As illustrated in FIG. 4, the chip-type coil component 3 according to the third embodiment differs from the chip-type coil component 2 according to the second embodiment in that the metal film 61 is provided only on the bottom surface of the recessed part 60 and its surrounding area. Other basic configurations are the same as those of the chip-type coil component 2 according to the second embodiment, so the same reference numerals are given to the same elements, and overlapping description will be omitted.

According to the present embodiment, the metal film 61 is provided only on the bottom surface of the recessed part 60 and its surrounding area, so that magnetic flux generated by current flowing in the coil pattern C is less likely to be blocked by the metal film 61. In particular, removal of the metal film 61 at a position overlapping the inner diameter area of the coil pattern C as viewed in the coil axis direction allows a significant reduction in eddy current loss due to the metal film 61.

Fourth Embodiment

Figure 5:
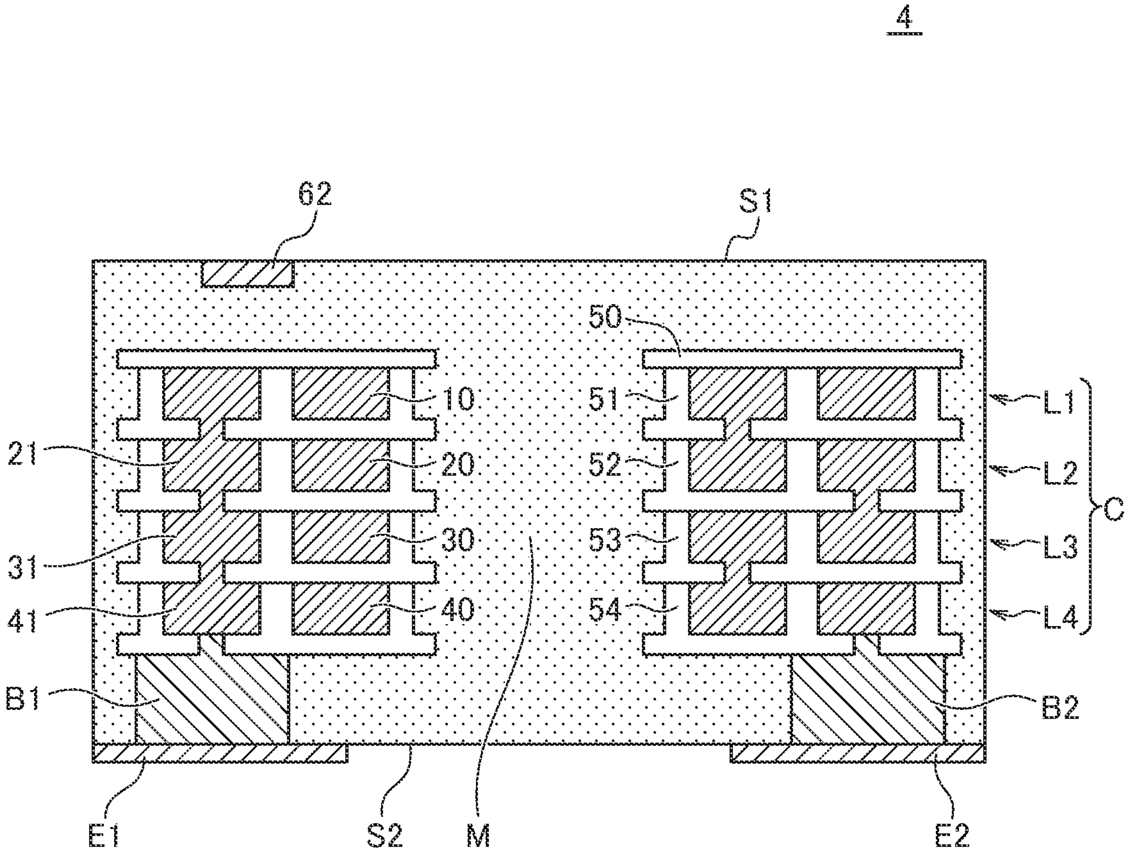
FIG. 5 is a schematic cross-sectional view illustrating a chip-type coil component 4 according to a fourth embodiment of the present disclosure.

FIG. 5 is a schematic cross-sectional view illustrating a chip-type coil component 4 according to a fourth embodiment of the present disclosure.

As illustrated in FIG. 5, the chip-type coil component 4 according to the fourth embodiment differs from the chip-type coil component 1 according to the first embodiment in that the recessed part 60 is filled with a filling member 62. Other basic configurations are the same as those of the chip-type coil component 1 according to the first embodiment, so the same reference numerals are given to the same elements, and overlapping description will be omitted.

The filling member 62 is made of a material having contrast with the upper surface S1 of the magnetic element body M so as to improve the visibility thereof as a directional mark. The filling member 62 is not particularly limited in material and may be made of a non-magnetic material such as colored resin, a metal material, or a magnetic material such as ferrite or permalloy. When colored resin is used as the material of the filling member 62, the directional mark can be made to have desired color. When a metal material is used for the filling member 62, high contrast can be obtained due to a difference in reflectivity between the upper surface S1 of the magnetic element body M and the filling member 62. When a magnetic material is used for the filling member 62, a reduction the volume of the magnetic element body M due to formation of the recessed part 60 is compensated for, whereby inductance of a product can be increased.

Fifth Embodiment

Figure 6:
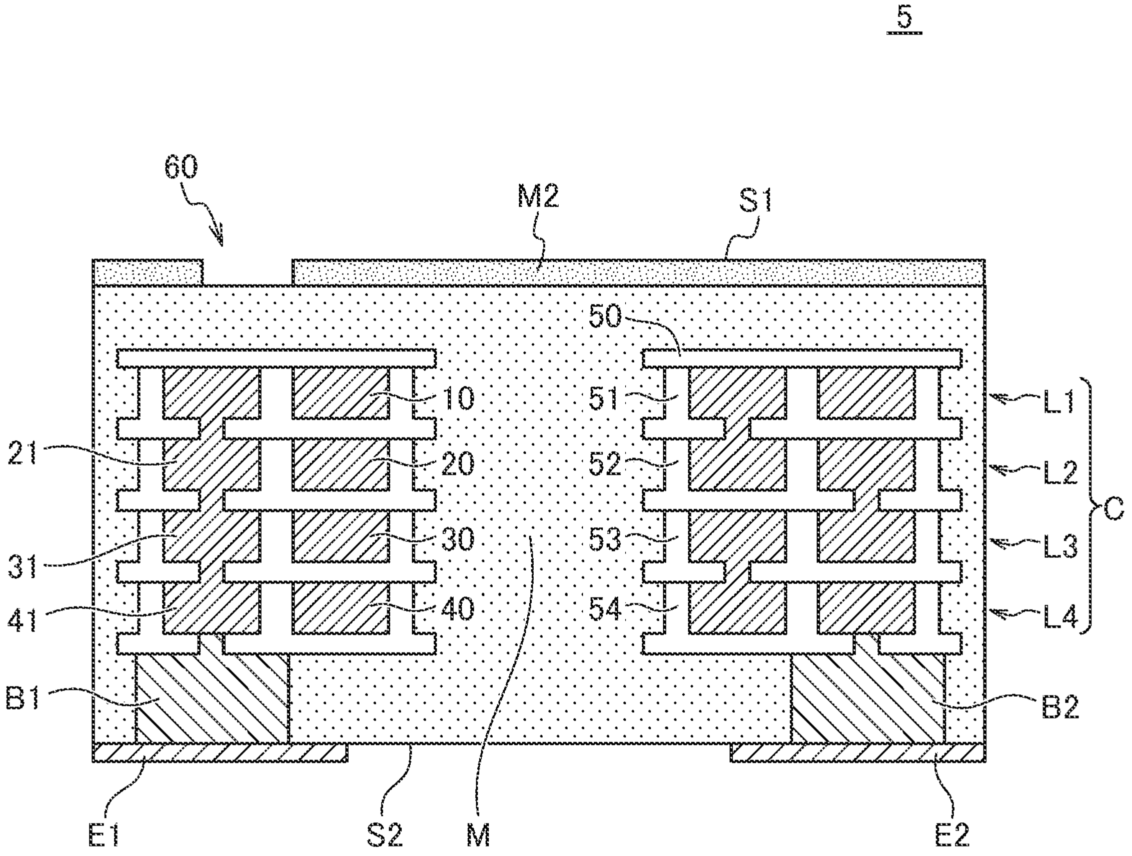
FIG. 6 is a schematic cross-sectional view illustrating a chip-type coil component 5 according to a fifth embodiment of the present disclosure.

FIG. 6 is a schematic cross-sectional view illustrating a chip-type coil component 5 according to a fifth embodiment of the present disclosure.

As illustrated in FIG. 6, the chip-type coil component 5 according to the fifth embodiment differs from the chip-type coil component 1 according to the first embodiment in that the magnetic element body M is constituted by a main body part M1 and a surface layer part M2 and that the recessed part 60 is formed so as to penetrate the surface layer part M2. Other basic configurations are the same as those of the chip-type coil component 1 according to the first embodiment, so the same reference numerals are given to the same elements, and overlapping description will be omitted.

The main body part M1 and surface layer part M2 of the magnetic element body M are both a composite magnetic member containing magnetic metal fillers made of iron (Fe) or a permalloy-based material and a resin binder. The main body part M1 is a part in which the coil pattern C is embedded. The surface layer part M2 constitutes the upper surface S1 of the magnetic element body M and has contrast with the main body part M1. To make contrast between the main body part M1 and the surface layer part M2 high, the average particle diameter of the magnetic fillers contained in the main body part M1 and the average particle diameter of the magnetic fillers contained in the surface layer part M2 may be made different. In particular, when the average particle diameter of the magnetic fillers contained in the surface layer part M2 is made smaller than the average particle diameter of the magnetic fillers contained in the main body part M1, magnetic fillers with a large particle diameter serve to improve the magnetic characteristics of the main body part M1, while magnetic fillers having a small particle diameter serve to facilitate laser machining for the surface layer part M2.

Further, since the recessed part 60 is formed so as to penetrate the surface layer part M2, the main body part M1 is exposed to the bottom surface of the recessed part 60. This makes contrast between the upper surface S1 of the magnetic element body M and the recessed part 60 high, allowing the recessed part 60 to be used as a directional mark. In place of the composite magnetic member, a magnetic material such as ferrite or permalloy may be used as the material of the surface layer part M2.

Sixth Embodiment

Figure 7:
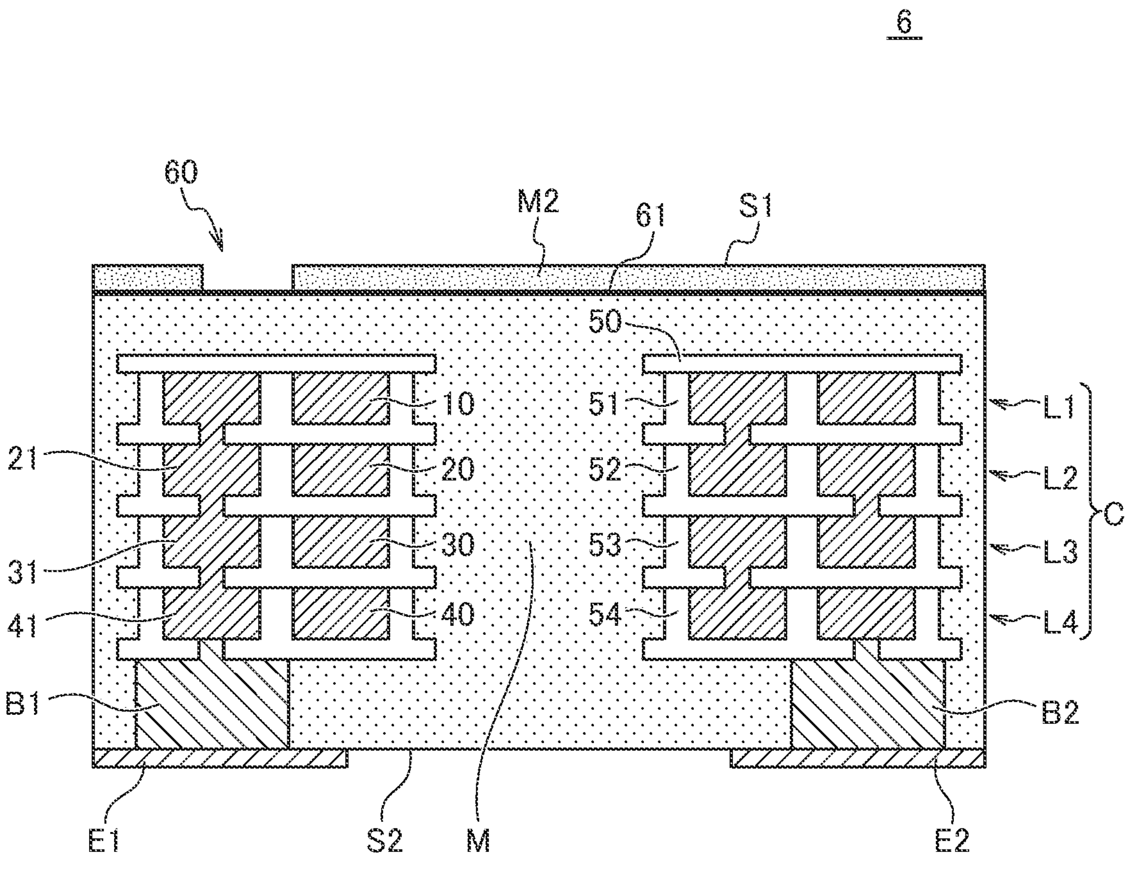
FIG. 7 is a schematic cross-sectional view illustrating a chip-type coil component 6 according to a sixth embodiment of the present disclosure.

FIG. 7 is a schematic cross-sectional view illustrating a chip-type coil component 6 according to a sixth embodiment of the present disclosure.

As illustrated in FIG. 7, the chip-type coil component 6 according to the sixth embodiment differs from the chip-type coil component 5 according to the fifth embodiment in that the metal film 61 is embedded in the magnetic element body M. Other basic configurations are the same as those of the chip-type coil component 5 according to the fifth embodiment, so the same reference numerals are given to the same elements, and overlapping description will be omitted.

The metal film 61 is provided between the main body part M1 and the surface layer part M2. Thus, the metal film 61 functions as a stopper upon formation of the recessed part 60 by laser machining for the surface layer part M2. This facilitates adjustment of the depth of the recessed part 60.

Seventh Embodiment

Figure 8:
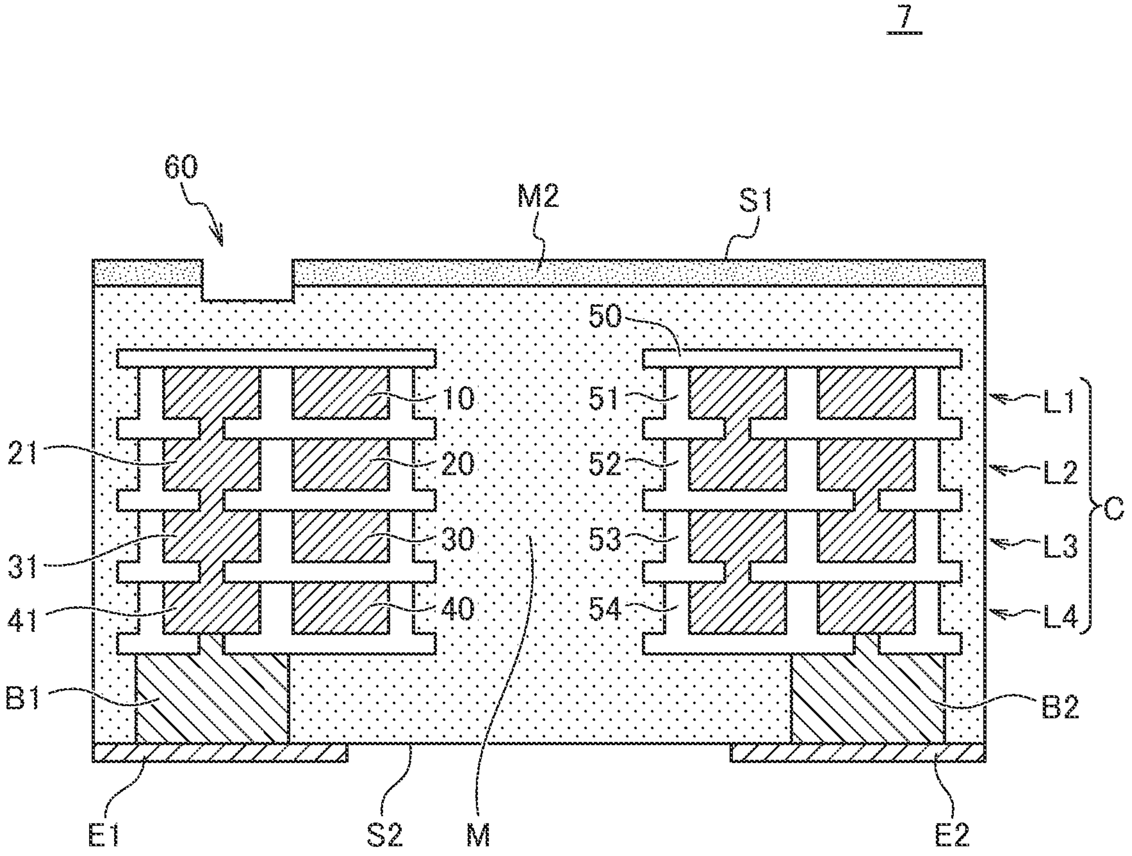
FIG. 8 is a schematic cross-sectional view illustrating a chip-type coil component 7 according to a seventh embodiment of the present disclosure.

FIG. 8 is a schematic cross-sectional view illustrating a chip-type coil component 7 according to a seventh embodiment of the present disclosure.

As illustrated in FIG. 8, the chip-type coil component 7 according to the seventh embodiment differs from the chip-type coil component 5 according to the fifth embodiment in that the recessed part 60 is formed to reach into the main body part M1. Other basic configurations are the same as those of the chip-type coil component 5 according to the fifth embodiment, so the same reference numerals are given to the same elements, and overlapping description will be omitted.

In the present embodiment, the recessed part 60 penetrates the surface layer part M2 and bites into the magnetic element body M so as to remove a part of the main body part M1. Thus, the depth dimension of the recessed part 60 is sufficiently ensured, thereby achieving high contract.

Eighth Embodiment

Figure 9:
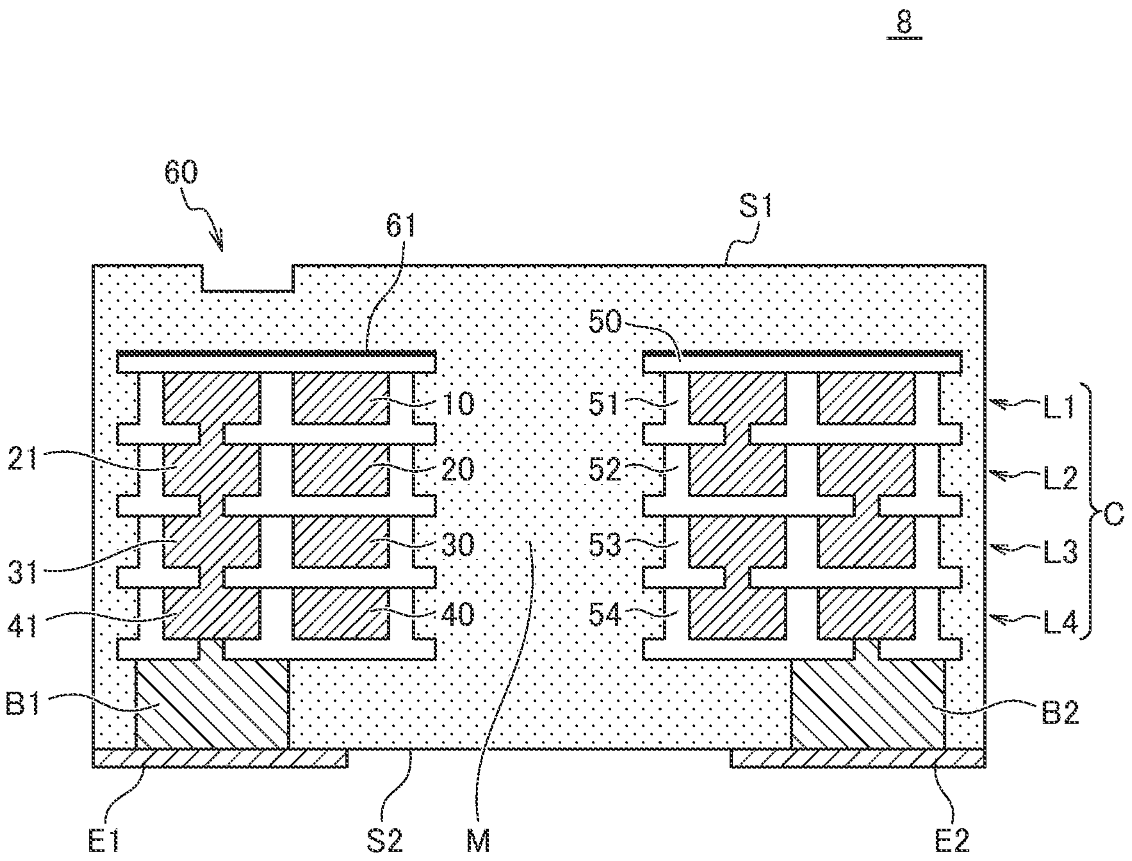
FIG. 9 is a schematic cross-sectional view illustrating a chip-type coil component 8 according to an eighth embodiment of the present disclosure.

FIG. 9 is a schematic cross-sectional view illustrating a chip-type coil component 8 according to an eighth embodiment of the present disclosure.

As illustrated in FIG. 9, the chip-type coil component 8 according to the eighth embodiment differs from the chip-type coil component 1 according to the first embodiment in that the metal film 61 is provided on the surface of the interlayer insulating film 50 positioned on the upper surface S1 side of the magnetic element body M. Other basic configurations are the same as those of the chip-type coil component 1 according to the first embodiment, so the same reference numerals are given to the same elements, and overlapping description will be omitted.

In the present embodiment as well, the metal film 61 functions as a stopper upon formation of the recessed part 60 by laser machining; however, the recessed part 60 does not reach the metal film 61. Providing this metal film 61 prevents the depth dimension of the recessed part 60 from being excessively large due to manufacturing variations, which in turn can prevent the col pattern C from being damaged.

While the preferred embodiment of the present disclosure has been described, the present disclosure is not limited to the above embodiment, and various modifications may be made within the scope of the present disclosure, and all such modifications are included in the present disclosure.

The technology according to the present disclosure includes the following configuration examples but not limited thereto.

A chip-type coil component according to the present disclosure includes: a magnetic element body; a coil pattern embedded in the magnetic element body; and a terminal electrode connected to the coil pattern and exposed to the mounting surface of the magnetic element body, wherein a recessed part obtained by removing a part of the magnetic element body is formed in the upper surface of the magnetic element body positioned on the side opposite the mounting surface to function as a directional mark.

According to the present disclosure, the recessed part formed in the magnetic element body functions as a directional mark, so that it is possible to minimize a reduction in the volume of the magnetic element body due to the presence of the directional mark.

The chip-type coil component according to the present disclosure may further include a metal film embedded in the magnetic element body and positioned between the recessed part and the coil pattern. With this configuration, the metal film functions as a stopper upon formation of the recessed part by laser machining. This facilitates adjustment of the depth of the recessed part.

In the present disclosure, the recessed part may be filled with a filling member having contrast with the upper surface of the magnetic element body. This makes it possible to improve visibility of the directional mark.

In the present disclosure, the magnetic element body may include a main body part in which the coil pattern is embedded and a surface layer part constituting the upper surface and having contrast with the main body part, and the recessed part may be formed so as to penetrate the surface layer part. This makes it possible to improve visibility of the directional mark. In this case, the average particle diameter of the magnetic fillers contained in the surface layer part may be smaller than the average particle diameter of the magnetic fillers contained in the main body part. This makes it possible to achieve high machinability while maintaining magnetic characteristics of the magnetic element body.

In the present disclosure, the surface roughness of the bottom surface of the recessed part may differ from the surface roughness of the upper surface of the magnetic element body. This makes it possible to enhance the visibility of directional mark.

As described above, according to the present disclosure, it is possible to suppress a reduction in the volume of the magnetic element body in a chip-type coil component having a directional mark.

What is claimed is:

1. A chip-type coil component comprising:
- a magnetic element body;
- a coil pattern embedded in the magnetic element body; and
- a terminal electrode connected to the coil pattern and exposed to a mounting surface of the magnetic element body,
- wherein a recessed part obtained by removing a part of the magnetic element body is formed in an upper surface of the magnetic element body positioned on a side opposite the mounting surface to function as a directional mark, and
- wherein the magnetic element body includes a main body part in which the coil pattern is embedded and a surface layer part constituting the upper surface and having contrast with the main body part,
- wherein the recessed part is formed so as to penetrate the surface layer part, and
- wherein an average particle diameter of magnetic fillers contained in the surface layer part is smaller than an average particle diameter of magnetic fillers contained in the main body part.

2. The chip-type coil component as claimed in claim 1, further comprising a metal film embedded in the magnetic element body and positioned between the recessed part and the coil pattern.

3. The chip-type coil component as claimed in claim 1, wherein the recessed part is filled with a filling member having contrast with the upper surface of the magnetic element body.

4. The chip-type coil component as claimed in claim 1, wherein a surface roughness of a bottom surface of the recessed part differs from a surface roughness of the upper surface of the magnetic element body.

* * * * *